Figure 1:
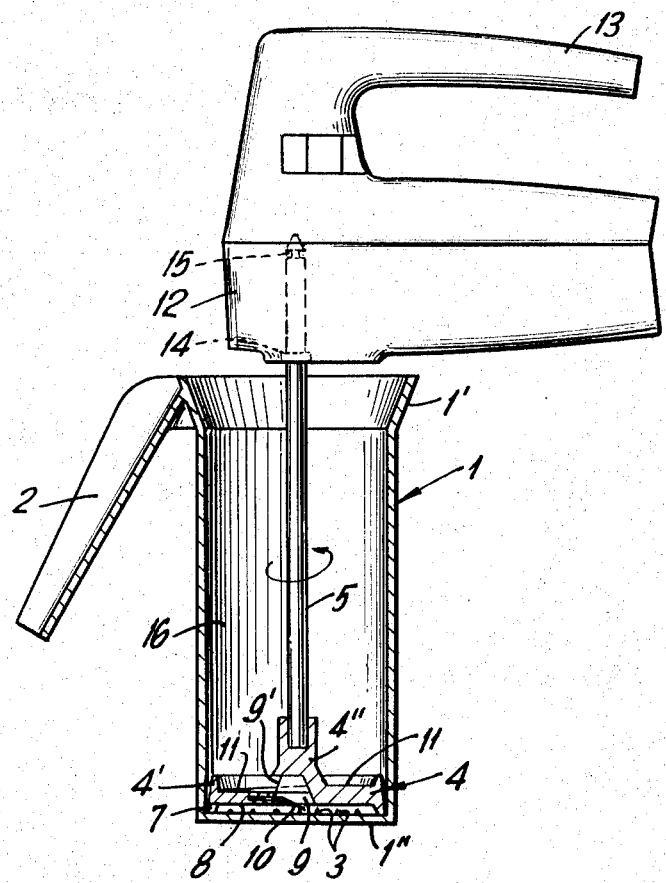

United States Patent Office 3,335,772
Patented Aug. 15, 1967

3,335,772
COMMINUTING ATTACHMENT FOR HAND MIXER
Eberhard Menge, Reichenbach (Fils), Germany, assignor to Electrostar GmbH, Reichenbach (Fils), Germany
Filed Jan. 26, 1965, Ser. No. 428,159
Claims priority, application Germany, Jan. 29, 1964, E 26,304
8 Claims. (Cl. 146—68)

This invention relates in general to cutting, grating or mixing devices, and in particular to a new and useful rotary disk member and receptacle which cooperate for cutting, chipping or grating or mixing foods and similar materials.

Small portable electrically driven kitchen appliances, so called hand mixers, are known. Shafts of beaters or hooks are inserted into the housing of such a kitchen appliance in an interchangeable manner for driving by the electric motors and gearing in the housing. Up to the present time, tools of this nature have been suitable only for beating and stirring foods such as juices, cream, batter and the like.

In accordance with the present invention, there is provided an attachment for a rotary drive kitchen appliance, such as a portable hand mixer, which makes the mixer suitable for crushing, cutting, chipping or grating materials, particularly foods. The apparatus advantageously includes a cutting and crushing disk member which operates in a container having an interior diameter corresponding to the exterior diameter of the disk member. In a preferred arrangement, the disk member advantageously includes a plurality of projections or cutting teeth and, in addition, one or more cutting tools or crushing implements. The apparatus is used by mounting the disk member on a rotary shaft which is driven from a tool such as a portable mixer housing and thereafter pressing the disk member downwardly into a container filled with materials to be cut or grated. A suitable container for such a purpose is advantageously one with a uniform diameter throughout its height but with upper walls which bevel outwardly to permit easy insertion of the disk member which is advantageously of a slightly smaller diameter.

The material to be cut or grated is simply filled into the cylindrical receptacle, and thereafter the cutting disk is introduced into the receptacle after it has been mounted on an end of a hand beater, for example. During rotation of the disk it is pressed downwardly onto the materials into the receptacle from the top downwardly to cause the cutting or grating of the material as the disk advances downwardly therethrough. The material under the disk is cut by the downward pressure exerted by the operator. In a preferred arrangement, the disk advantageously includes a spirally extending hole defined from the center up to the top surface thereof which, during rotation of the disk, permits the direction of the cut material upwardly to the top side of the disk. The disk is moved downwardly until it moves to the bottom of the container to which location it will advance after cutting through the material in the container. When it has arrived at the bottom of the container, all of the cut material will be located above the disk, and this material may be removed simply by removing the disk from the container.

The device of the invention may be used with dry material such as nuts or juicy articles like onions, for example. These materials can be cut without requiring the presence of a liquid as is the case with the so-called blenders, where the electromotor and cutter work at full speed. The invention is particularly applicable where the disk is mounted on a shaft which is adapted to be carried by a motor housing such as a hand mixer where there is gearing to rotate the disk shaft at a relatively low speed. By causing the disk to rotate at a much slower speed than the cutters of blenders, the work of the cutting tool according to the invention is made possible.

In one embodiment of the invention, the disk advantageously includes means for mounting either eccentrically or concentrically a journal for a knife element or bar so that the knife element is always carried below the disk as it moves the material to be cut. In such an arrangement, the disk element itself advantageously includes a cutting tool and the knife element is preferably made with cutting teeth at the periphery thereof. The knife element functions to aid in the cutting of the material as the disk is moved downwardly, and also in providing means for stabilizing the material so that it does not continuously whirl after the disk is moved downwardly.

Accordingly, it is an object of this invention to provide an improved device for cutting materials which includes a disk adapted to be rotated through the materials having means for cutting the materials and for displacing them upwardly through an opening of the disk to the opposite side thereof as the disk is advanced through the material.

A further object of the invention is to provide a combination receptacle or cutting disk element with the cutting disk being rotatably mounted on a shaft or an attachment element of a hand motor drive, such as a hand mixer, and being of a diameter slightly smaller than the diameter of the receptacle so that it may be inserted into the receptacle, the disk having cutting means at its lower surface and an opening extending from the lower surface to the upper surface whereby material in the container may be cut and fed upwardly to the top surface of the disk as it is advanced through the material.

A further object of the invention is to provide a cutting disk construction which includes a disk member having a substantially central opening for the passage of material therethrough with at least one cutting tool arranged adjacent the opening on the underside of the disk preferably with one or more cutting gears arranged around the periphery of the disk.

A further object of the invention is to provide a cutting device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 2:
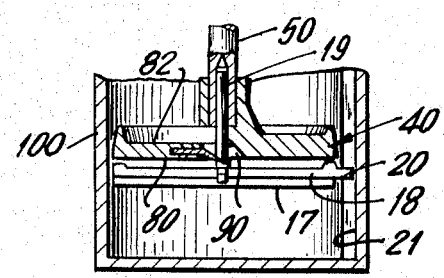

In the drawings:

FIG. 1 is a transverse sectional view through a container and cutting disk constructed in accordance with the invention; and FIG. 2 is a partial view similar to FIG. 1 of another embodiment of the invention.

Referring to the drawings in particular, the invention embodied therein comprises an appliance or device for cutting, grating or crushing materials within a cylindrical container generally designated 1 using a cutting disk element generally designated 4.

In accordance with the invention, the appliance is advantageously adapted for use with a small motor drive and gear transmission which is contained in a housing 12 of a type which is usually employed for a portable mixer or beating device. The housing 12 has a handle 13 which permits the transport and movement of the device and the underside is provided with an opening for receiving a shaft 5 which has a cutting disk 4 secured to an opposite end for rotation therewith. In the embodiment illustrated, the shaft 5 is received within a recess defined within the housing 12 and is secured in a driving coupling such as by a through pin 14 and by a fork member which engages around a groove 15 defined at the upper end of the shaft. The interior of the housing 12 advantageously includes gearing and a driving electric motor (not shown). The gearing is advantageously such that the shaft 5 will be rotated at a speed which is slower than the speed of the driving motor.

Receptacle 1 may be of any suitable material such as plastic, metal, and the like, and is advantageously provided with a flared or widened top 1' for facilitating the centering of the disk 4 when it is inserted into the receptacle. The major portion of the receptacle is of uniform diameter. The receptacle 1 includes a handle 2 for manipulating the receptacle. The bottom wall of the receptacle is advantageously formed with projections 3 which point upwardly and inhibit the whirling movement of the material in the container when the shaft 5 with the disk 4 is rotated.

The disk 4 advantageously has a maximum diameter which is somewhat smaller than the internal diameter of the lower portion of the container 1. In a preferred arrangement, the side walls of the disk slope or taper inwardly toward the top and the top diameter is slightly smaller than the bottom diameter. The disk edge 4' has a conical form. In the embodiment illustrated, the periphery of the disk is provided with downwardly projecting teeth or serrations 7. In the embodiment illustrated, the outer rim is designed as a complete gear rim, and each tooth 7 has edges forming blades.

The disk 4 may advantageously be made of a metal or suitable plastic material and it includes a passageway 9 which extends in substantially a radial direction from a bottom face 8 of the disk to a top face 11 thereof. In the embodiment illustrated, the bottom of the end of the passageway 9 is located at the center of the disk face 8 and the upper end extends tangentially into the face 11 at the top of the disk. The disk 4 is advantageously recessed or provided with a slot for receiving an interchangeable tool element 10 which in the embodiment illustrated is a knife blade element. The outer edge of the cutting blade 10 extends into the passageway 9 and preferably slightly below the bottom disk surface 8. The blade edge advantageously extends in one direction radially to the outside of the disk, but it can also extend in another direction slightly beyond the disk center in such a way that the material which is moved toward the center of the disk will also be cut.

The disk 4 is advantageously provided with a hub portion 4" which is made of conical configuration at its lower end and has a cut-out 9' defining the upper end of the passageway 9. It should be appreciated that the cutting tool 10 may be replaced, such as by a chipping and grating tool which is advantageously inserted into the disk such as by sliding it into a groove or slot from one edge of the disk. The passageway 9 is designed such that the flow of the material will be through a helical passage which rises on a helical surface formed on the top of the disk at the surface 11.

To use the device, the materials to be cut, for example vegetables, are placed into the receptacle 1 by the housewife, and after this, the tool disk 4 is inserted by grasping the handle 13 of the appliance and moving the disk downwardly into the top of the receptacle 1 until it bears on the material therein. The widening 1' of the receptacle facilitates the introduction of the revolving tool disk 4. With the other hand, the housewife can either grip the receptacle handle 2, or the receptacle body portion directly. For cutting, chipping or other crushing operations, the housewife has merely to apply downward pressure to the tool disk 4 through the handle 13. As the disk is moved downwardly through the material, the material will be cut and moved through the passage 9. The tool cuts through the material from top to bottom, and when the disk reaches the bottom of the receptacle, all of the material on the top surface 11 of the disk will be cut. Because the material is delivered onto the helical rising surface terminating in the upper helical surface 11, it is lifted as the disk is rotated. The upward flow of the cut material is thus insured at each revolution of the crank disk 4.

It has been found that the cutting operation is accelerated if the uncut material below the disk is hindered from being carried along by the rotation of the disk. To this end the projections 3 are provided in the embodiment of FIG. 1. These projections act to retain the material or slow it down so that it will not be carried along with the rotation of the disk.

When the disk 4 has reached its bottom position, the housewife can shut off the motor in the housing 12 and remove the disk 4 through the top of the receptacle at which time the material will be simultaneously lifted and discharged. By making the outer disk edge 4' conical, it is assured that the disk cannot jam in the receptacle so that the housewife does not have to maintain the drive shaft 5 exactly centered therewithin. The cutting teeth 7 have the effect that the material to be cut touches the receptacle wall.

In the embodiment of FIG. 2, there is indicated a disk 40 which is mounted on a shaft 50 having a bore defined through its bottom face in which a bearing pin or journal 19 is slidable. The bearing pin 19 extends through an opening defining a passageway 90 and to its lower end is secured a knife bar 18 which is formed as a diametrical strip having a projection 20 which is confined in a vertical recess 21 defined on one portion of the interior wall of the receptacle 100.

In this embodiment, the disk 40 may be made with a flat bottom face 80, but its upper face 82 may have a helically rising surface as in the other embodiment. The journal 19 is freely rotatable and slidable within the shaft 50, so that the knife carried thereby may be confined in a stationary position below the disk 40 during rotation of the shaft. The journal is of a construction such that it will be carried by the shaft 50 so that it will not be disassociated therefrom when in an operative position, but may move upwardly and downwardly relative to the shaft during operation of the device.

In the embodiment of FIG. 2, cutting gear element are advantageously formed on each end of the knife 18, and, in addition, the knife bar 18 includes a bottom edge 17 which is of a length corresponding approximately to the diameter of the disk 40. It should be appreciated that the knife bar 18 may also be replaced by a knife element which is of another configuration such as a star-shaped configuration. The groove 21 defined in the container 100 permits upward and downward movement of the knife bar 18 with the disk during the operation. During the operation of the knife, the knife bar 18 is moved downwardly below the disk 40 and is always spaced from the disk. For this purpose, the journal 19 is advantageously dimensioned such that the bar 18 will be spaced from the bottom surface 80 of the disk at all times during the operation.

While specific embodiments of the invention have been shown and described in detail to illustrate the application of the inventive principles, it will be understood that the invention may be embodied otherwise without departing from such principles.

What is claimed is:

1. A cutting device, particularly for use with a motor driven housing utensil and with a cylindrical container for materials to be cut, comprising a disk adapted to be mounted for rotation about an axis and having a bottom face with cutting means defined thereon, and a passage extending axially therethrough for the passage of cut material therethrough, said disk being rotatable in the container through the material, whereby to cut the material and deliver it through the passage as said disk is moved downwardly through the material, said disk having an upwardly spiraling top surface extending from said passageway upwardly around said disk.

2. A cutting device, particularly for use with a motor drive housing utensil and with a cylindrical container for materials to be cut, comprising a disk adapted to be mounted for rotation about an axis and having a bottom face with cutting means defined thereon, and a passage extending axially therethrough for the passage of cut material therethrough, said disk being rotatable in the container through the material, whereby to cut the material and deliver it through the passage as said disk is moved downwardly through the material, a mounting shaft connected to said disk and extending outwardly from one surface thereof, a journal slidable in said shaft extending outwardly from the opposite surface of said disk, and a knife bar carried by said journal at a spaced location from the opposite surface of said disk from said shaft.

3. A cutting device, particularly for use with a motor drive housing utensil device, comprising a cylindrical container, a disk of a diameter corresponding substantially to the interior diameter of said cylinder and being movable in said container, a drive shaft connected to said disk and extending outwardly from one face thereof, means connected to said drive shaft for rotating said drive shaft, said means permitting the insertion and reciprocation of said disk in said container, said disk having a passage extending axially therethrough for the passage of cut material, and cutting means defined on the surface opposite from said drive shaft for cutting material in the container as the disk is moved downwardly therethrough, said passage being of a configuration to cause the cut material to flow therethrough from the underside to the top side as the disk is rotated, a journal member slidable in said shaft and extending through said disk to the opposite lower face thereof, and a knife bar carried by said journal and held thereby in a spaced relationship to the bottom surface of said disk.

4. A cutting device, particularly for use with a motor drive housing utensil device, comprising a cylindrical container, a disk of a diameter corresponding substantially to the interior diameter of said cylinder and being movable in said container, a drive shaft connected to said disk and extending outwardly from one face thereof, means connected to said drive shaft for rotating said drive shaft, said means permitting the insertion and reciprocation of said disk in said container, said disk having a passage extending axiallly therethrough for the passage of cut material, and cutting means defined on the surface opposite from said drive shaft for cutting material in the container as the disk is moved downwardly therethrough, said passage being of a configuration to cause the cut material to flow therethrough from the underside to the top side as the disk is rotated, a journal member slidable in said shaft and extending through said disk to the opposite lower face thereof, and a knife bar carried by said journal and held thereby in a spaced relationship to the bottom surface of said disk, a groove defined in said container, said knife bar having a projection confined in said groove and preventing rotation of said knife bar during rotation of said disk.

5. A cutting device, particularly for use with a motor drive housing utensil device, comprising a cylindrical container, a disk of a diameter corresponding substantially to the interior diameter of said cylinder and being movable in said container, a drive shaft connected to said disk and extending outwardly from one face thereof, means connected to said drive shaft for rotating said drive shaft, said means permitting the insertion and reciprocation of said disk in said container, said disk having a passage extending axially therethrough for the passage of cut material, and cutting means defined on the surface opposite from said drive shaft for cuting material in the container as the disk is moved downwardly therethrough, said passage being of a configuration to cause the cut material to flow therethrough from the underside to the top side as the disk is rotated, a journal member slidable in said shaft and extending through said disk to the opposite lower face thereof, and a knife bar carried by said journal and held thereby in a spaced relationship to the bottom surface of said disk, a groove defined in said container, said knife bar having a projection confined in said groove and preventing rotation of said knife bar during rotation of said disk, said knife bar having cutting means defined thereon between said bar and said disk.

6. A cutting device, particularly for use with a motor drive housing utensil device, comprising a cylindrical container, a disk of a diameter corresponding substantially to the interior diameter of said cylinder and being movable in said container, a drive shaft connected to said disk and extending outwardly from one face thereof, means connected to said drive shaft for rotating said drive shaft, said means permitting the insertion and reciprocation of said disk in said container, said disk having a passage extending axially therethrough for the passage of cut material, and cutting means defined on the surface opposite from said drive shaft for cutting material in the container as the disk is moved downwardly therethrough, said passage being of a configuration to cause the cut material to flow therethrough from the underside to the top side as the disk is rotated, said disk having cutting gear teeth defined adjacent the periphery thereof.

7. A device for crushing, and in particular cutting materials such as foods, for use in connection with a portable electrically driven kitchen appliance, comprising a vertically rotatable drive shaft, a cutting disk carried at the free bottom end of said drive shaft, a cylindrical receptacle into which said disk is movable, said receptacle being of a diameter substantially equal to the diameter of said disk, and at least one passageway defined in said disk for the passage of a cut material from the bottom to the top thereof, said passage comprising a radially extending slot defined through said disk and extending spirally from a bottom opening to a top opening.

8. A device according to claim 7, wherein said container has a widened top portion and a handle connected thereto.

References Cited
UNITED STATES PATENTS

| | | | |
|---|---|---|---|
| 1,212,915 | 1/1917 | Daughtry | 146—124 X |
| 1,429,896 | 9/1922 | McClure | 146—128 |
| 2,004,582 | 6/1935 | Muffly. | |
| 3,154,123 | 10/1964 | Tomlinson | 146—68 |

WILLIAM W. DYER, Jr., *Primary Examiner.*

W. GRAYDON ABERCROMBIE, *Examiner.*